United States Patent [19]

Willhaus

[11] Patent Number: 5,045,849

[45] Date of Patent: Sep. 3, 1991

[54] ACCESS DEVICE FOR AN ISDN CONNECTING DEVICE OF A PUBLIC TERMINAL

[75] Inventor: Werner Willhaus, Stuttgart, Fed. Rep. of Germany

[73] Assignee: Standard Elektrik Lorenz AG, Stuttgart, Fed. Rep. of Germany

[21] Appl. No.: 456,324

[22] Filed: Dec. 26, 1989

[30] Foreign Application Priority Data

Dec. 24, 1988 [DE] Fed. Rep. of Germany ....... 3843785

[51] Int. Cl.$^5$ .......................... H04M 1/00; H04L 9/00
[52] U.S. Cl. ............................... 340/825.34; 235/376; 235/379; 235/382; 340/825.3
[58] Field of Search ................. 340/825.34, 825.3, 542, 340/543; 235/379, 382, 376

[56] References Cited

U.S. PATENT DOCUMENTS

| 4,006,459 | 2/1977 | Baker et al. | 340/825.34 |
| 4,134,537 | 1/1979 | Glaser et al. | 235/379 |
| 4,488,011 | 12/1984 | Rogers | 379/27 |
| 4,720,849 | 1/1988 | Tayama | 379/90 |

FOREIGN PATENT DOCUMENTS

| 3020728 | 12/1981 | Fed. Rep. of Germany |
| 3240660 | 5/1984 | Fed. Rep. of Germany |
| 3501292 | 7/1985 | Fed. Rep. of Germany |
| 8509209 | 9/1985 | Fed. Rep. of Germany |
| 3706406 | 9/1988 | Fed. Rep. of Germany |
| 661629 | 7/1987 | Switzerland |

OTHER PUBLICATIONS

Mayr-Stein, Horst: Offentliches Kartentelefonsystem, TN-Nachtrichten 12/1986, H.88.
Haass, Wolf—Dieter: Neue ISDN=Endgerate, TN--Nachtrichten 12/1986, H.89.
Produktschau, ntz.Bd. 40 (12/1987) H.11, p. 800.
Elektronisches Geld, Funkschau 3/1985, pp. 39-41.
R. Martens, "Anschlüsse für vermittelte Kommunikation", *Unterrichtsblatter Fernmeldewesen*, vol. 41, No. 6, Jun. 10, 1988, pp. 263-277.

Primary Examiner—Donald J. Yusko
Assistant Examiner—Peter Weissman
Attorney, Agent, or Firm—Christie, Parker & Hale

[57] ABSTRACT

An access device at a public communications terminal enables an authorized user to gain access, via a connecting device, to an integrated services digital communications network. The access device includes a connecting device (2) behind a protective member (4) which permits access only after a check of the user's access authorization and a test of the correct functioning of the connecting device.

16 Claims, 1 Drawing Sheet

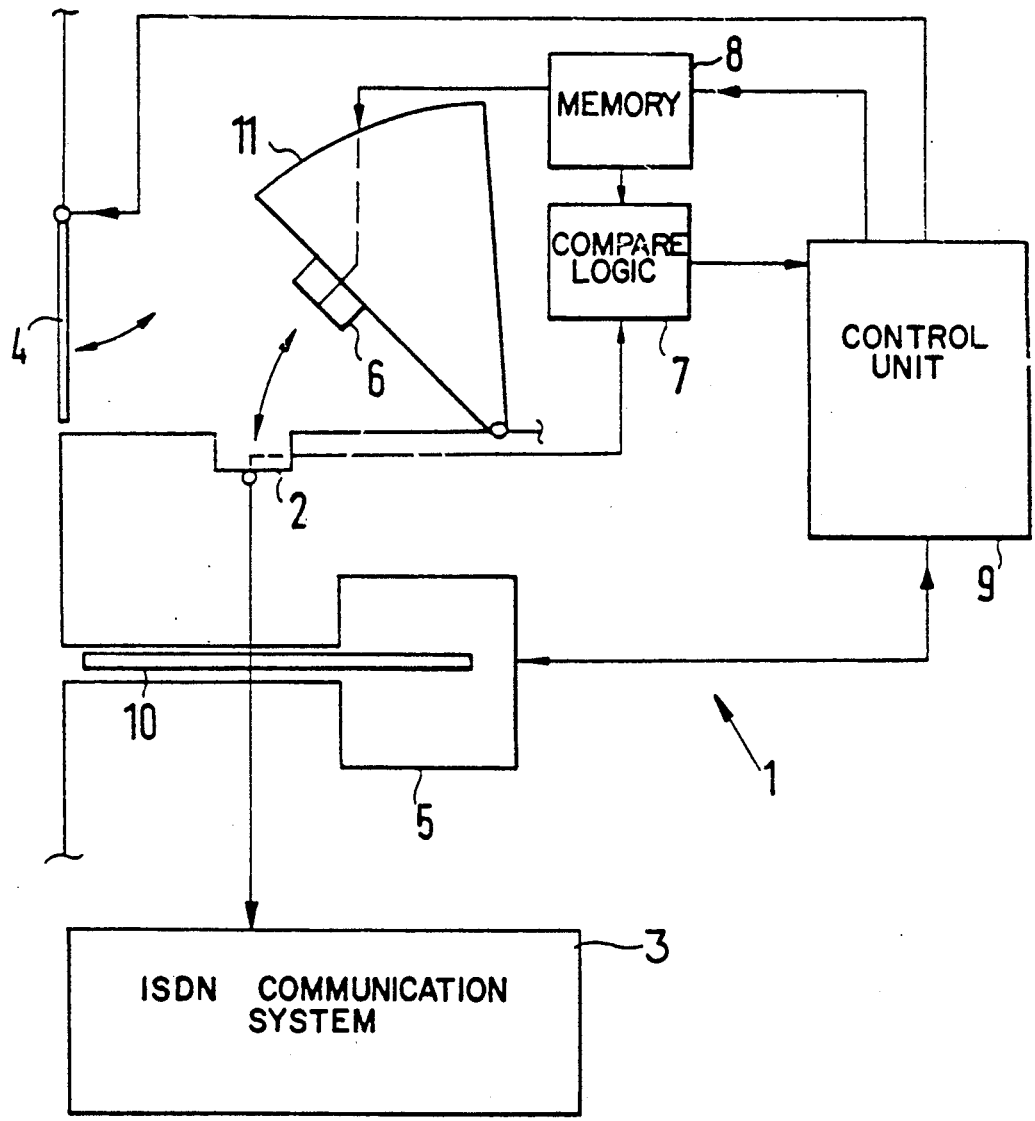

ACCESS DEVICE FOR AN ISDN CONNECTING DEVICE OF A PUBLIC TERMINAL

TECHNICAL FIELD

The present invention relates to the electrical and mechanical interface between a user terminal and a public communications network, and more particularly to method and apparatus for providing an authorized user with access to an electromechanical connector within a public communications terminal.

CLAIM FOR PRIORITY

This application is based on and claims priority from an application first filed in Fed. Rep. Germany on 24 Dec. 1988 under Ser. No. 38 43 785.6. To the extent such prior application may contain any additional information that might be of any assistance in the use and understanding of the invention claimed herein, it is hereby incorporated by reference.

BACKGROUND ART

With the implementation of a nationwide integrated services digital communications network, a host of new services and features will be available, from conventional voice telephone service to data communication or facsimile. Access to the communications network is made possible via a connecting device to which a communications terminal is connected. Instead of the hitherto used connector socket, a communication connecting unit is now provided (Refer to Unterrichtsblätter der Deutschen Bundespost, Fernmeldewesen, No. 6, 1988, p. 263 et seq).

DISCLOSURE OF INVENTION

It is the object of the present invention to provide an access device for a public communications terminal and a method of operating said device in order to enable an authorized user to access a connecting device of an integrated services digital communications network. In accordance with the invention, a protective member normally protects a connector within the public communications terminal from unauthorized access. The protective device is moved to a position which permits the user to access the connector after the user's access authorization has been checked and the proper functioning of the connector has been verified.

The provision of the device according to the invention for allowing access to a connecting device of an integrated services digital communications network makes it possible to utilize a great number of new services and features of publicly accessible communications terminals, such as coin or card telephones or public videotex terminals. The access device in accordance with the invention ensures that only authorized users are granted access. Since public terminals are exposed to an agressive environment, the access device in accordance with the invention also protects the connecting device from vandalism or attempted fraud. In addition, the proper functioning of the connecting device is checked on a regular basis.

BRIEF DESCRIPTION OF DRAWINGS

An embodiment of the invention will now be explained with refererence to the accompanying drawing in which the single figure depicts a public communications terminal provided with a moveable flap for controlling access to a connector.

BEST MODE FOR CARRYING OUT THE INVENTION

An access device according to the invention for a public communications terminal 1 includes a connecting device 2 which is connected to an integrated services digital communications network 3. The figure shows only those parts of the terminal 1—in this embodiment a card telephone—which are relevant to the present invention. Further, the connection to the communications network 3 is indicated only schematically.

The access device comprises a protective member 4 via which access to the connecting device 2 is permitted or blocked. The protective member 4 may be a simple flap as shown in the figure, or a slide. A rotatable arrangement of a protective member 4 and a connecting device 2 in the form of a drum is also possible (not shown).

The access device includes first means 5 for preventing unauthorized access and second means 6 for checking the correct functioning of the connecting device 2. The first means 5, the second means 6, and the protective member 4 are connected to a control unit 9.

As the first means 5 for checking the user's authorization for access, an input, reading, and evaluating unit 5 for a record carrier 10 introduced into the card telephone is used. The record carrier 10 is, for example, a stored-value card ("chip card") or a credit card which is introduced into the input unit, refer to the figure, for checking the user's authorization for access. Such a card telephone with an input, reading, and evaluating unit 5 are well known to the art (note German Patent DE-30 20 728 C2).

Instead of checking the user's authorization for access by means of an input, reading, and evaluating unit for record carriers, use can be made of a keyboard with an evaluating unit via which an authorization code is entered and evaluated. In particular, the pushbutton set of the card telephone or of a coin telephone can be used.

The connecting device 2 is designed as an electromechanical communication connecting unit as has been standardized by the German Bundespost (refer to the figure), via which a plug-and-socket connection can be made with the communications network 3.

To check the correct functioning of the communication connecting unit (German abbreviation: TAE, for Telekommunikationsanschalteeinheit), the second means are constituted by an electro-mechanical plug 6. The plug 6 is connected with a pivoted member 11 in such a way that a plug-and-socket connection can be made with the communication connecting unit and separated again under control of the control unit 9 (refer to the figure).

To be able to check not only the mechanical operation of the communication connecting unit, in a further embodiment of the invention, the second means includes a comparing unit 7 and a test-program memory 8. The control unit 9 is connected to the test-program memory 8 for starting a test operation and to the comparing unit 7 for receiving data for the test results. The test-program memory 8 is also connected to the comparing unit 7 for the transfer of desired values. The comparing unit 7 is also connected to the communication connecting unit 2.

To establish the connection with the digital communications network 3, the connecting device 2 may include an isolating connecting element (not shown) via which an electro-optical, inductive, or capacitive connection can be made. A combination of these possibilities, such as inductive coupling for power supply and electro-optical coupling for signal transmission, is also realizable.

The access device just described is operated as follows.

To make the communication connecting unit 2 accessible to a user for, e.g., a data transmission via the ISDN, in a first step the user's authorization for access is checked. To this end, the user inserts his credit card, for example, into the input, reading, and evaluating unit 5. The data read from the card is evaluated, and data indicating a positive or negative result of the check is transferred to the control unit 9.

Under control of the control unit 9, first test of the correct functioning of the communication connecting unit 2 is then initiated. As shown schematically in the figure, the electro-mechanical plug 6 is inserted into the communication connecting unit 2 with the aid of the pivoted member 11 to test the communication connecting unit.

A test program is then read from the test-program memory 8 under control of the control unit 9. To this end, a test signal is sent for each test step to the communication connecting unit 2, and at the same time, a desired value is transferred to the comparing unit 7. In response to the test signal, an actual value is transferred from the communication connecting unit 2 to the comparing unit 7. If the comparison of the actual value to the desired value indicates an inadmissible deviation (predeterminable via threshold values), a negative partial-test result (error signal) will be transferred to the control unit 9. In similar fashion, the entire test program is executed step by step and an overall-test result is created.

A minimum program for checking the correct functioning of the communication connecting unit 2 consists of passing a current of a given magnitude through the plug contacts and determining the voltage drop across the latter. If the voltage drop is sufficiently small, namely below a predetermined threshold value, a positive test result will be transferred to the control unit 9.

The connection between the plug 6 and the communication connecting unit 2 is then separated again with the aid of the pivoted member 11.

If the results of the two checks, i.e., the check of the user's authorization for access and the first test of the correct functioning of the communication connecting unit, are positive, the flap 4 will be opened (refer to the figure) under control of the control unit 9, and the user can access the communication connecting unit.

According to a further advantageous aspect of the invention, the plug 6 is guided into such a position that after permission of access by the flap 4, the latter simultaneously prevents access to the plug 6.

When the access has been completed, the control unit causes the flap to block access. This is followed by another test of the communication connecting unit corresponding to the first test described above.

If the result of this second test is positive, all data determined for this user will be erased (reset) in the control unit 9, so that a next user can obtain access to the communication connecting unit.

If the result of any test of the communication connecting unit is negative (error message), any subsequent use access to the communication connecting unit will be permitted only after removal of the fault by, e.g., a service technician. After removal of the fault, the service technician may enter a reset command.

Such a fault is outputted in the form of a message, e.g., on a display of the card telephone.

This display can also be used to output user prompts in accordance with the method described above.

Since it frequently happens that even slight contamination of the contacts of the communication connecting unit results in a negative test result, according to a further advantageous feature of the invention, a message indicating the need to clean the communication connecting unit is presented to the user on the display.

Another advantage of the method according to the invention lies in the fact that during the check of the user's authorization for access, the user's identity can be additionally determined. This can be, for example, an identification number if a credit card is used, or an identification number must be additionally entered through the keyboard. This data is transferred to the control unit 9, where it can be retrievably stored to identifiy the user if the result of the second test of the communication connecting unit is negative. After the fault has been removed, this data is also cleared by the reset command entered by the service technician.

I claim:

1. Access control device for permitting an authorized user to connect a user terminal device to a communications network via an electro-mechanical access connector, the access control device comprising
   a movable protective member having a first position which prevents access to the connecting device and a second position which permits such access,
   first means for checking a user's access authorization,
   second means for checking the correct functioning of the electro-mechanical connector, and
   a control unit responsive to the first means and the second means for causing the protective member to assume the second position when the user is authorized to access the connecting device and the connecting device is functioning correctly.

2. An access control device as claimed in claim 1, wherein the protective member comprises a flap.

3. An access control device as claimed in claim 1, wherein the first means comprises a device for inputting, reading, and evaluating data from a recording medium provided by the user.

4. An access control device as claimed in claim 1, wherein the first means further comprises a keyboard and an evaluating unit connected to said keyboard.

5. An access control device as claimed in claim 1, wherein the electro-mechanical connector provides a plug-and-socket connection between a terminal associated with an authorized user and an integrated services digital communications network.

6. An access control device as claimed in claim 1, wherein the electro-mechanical connector further comprises an isolating connecting element.

7. An access control device as claimed in claim 5, wherein the second means comprises a mating electro-mechanical member which provides a temporary connection with the electro-mechanical connector under control of the control unit.

8. An access control device as claimed in claim 7, wherein, when not mated to the connector, the mating electro-mechanical member is moved to a position in which it is protected from access by the protective member, even when the protective member is in the second position.

9. An access control device as claimed in claim 1 wherein
the second means comprises a comparing unit and a test-program memory which are both connected to the control unit,
the test-program memory supplies desired values to the comparing unit and test signals to the connector,
the connector supplies, in response to the test signals, actual values to the comparing unit, and
the comparing unit sends a fault message to the control unit upon detection of an inadmissible difference between the desired value and the actual value.

10. A method of operating an access control device for permitting an authorized user to connect a user terminal device to a communications network via an electro-mechanical access connector having a control unit and a movable protective member, the protective member having a first position which blocks access to the connecting device and a second position which permits such access, the method comprising the steps:
 a) checking the user's authorization for access and storing data representing the result to the authorization check in the control unit;
 b) checking the correct functioning of the connector and storing data representing the result of the functioning check in the control unit;
 c) moving the protective member to the second position if and only if the results of the checks made in steps a) and b) are both positive;
then, following access to the communications network by such an authorized user:
 d) moving the protective member to the first position;
 e) rechecking the correct functioning of the connecting device; and either
  f1) erasing the data previously stored in the control unit, if and only if the result of the recheck made in step e) is positive; or
  f2) outputting a message indicating a fault, if and only if the result of the recheck made in step e) is negative.

11. A method as claimed in claim 10, wherein the message output in step f2) is a message indicating the need to clean the connector and the protective cover is moved back to the second position to permit such cleaning by an authorized user.

12. A method as claimed in claim 10, wherein
data corresponding to the user's identity is determined and transferred to the control unit during step a), and
a negative result in step d) results in the user's identity data being retrievably stored in the control unit until the fault has been removed.

13. An access control device as claimed in claim 6 wherein the isolating connecting element provides an electro-optical connection to the communications network.

14. An access control device as claimed in claim 6 wherein the isolating connecting element provides an inductive connection to the communications network.

15. An access control device as claimed in claim 6 wherein the isolating connecting element provides a capacitive connection to the communications network.

16. A method as claimed in claim 10 wherein a negative result in step d) results in the blocking of any further access by any user until the fault has been removed.

* * * * *